US012602475B2

(12) United States Patent
Pletka et al.

(10) Patent No.: US 12,602,475 B2
(45) Date of Patent: Apr. 14, 2026

(54) AGGREGATING INPUT/OUTPUT OPERATION FEATURES EXTRACTED FROM STORAGE DEVICES TO FORM A MACHINE LEARNING VECTOR TO CHECK FOR MALWARE

(71) Applicant: INTERNATIONAL BUSINESS MACHINES CORPORATION, Armonk, NY (US)

(72) Inventors: Roman Alexander Pletka, Uster (CH); Dionysios Diamantopoulos, Zurich (CH); Slavisa Sarafijanovic, Adliswil (CH); Charalampos Pozidis, Thalwil (CH); Yves Alexandre Beraldo dos Santos, Houston, TX (US); Andrew D. Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 18/453,089

(22) Filed: Aug. 21, 2023

(65) Prior Publication Data

US 2025/0068734 A1      Feb. 27, 2025

(51) Int. Cl.
G06F 21/56        (2013.01)
G06F 21/55        (2013.01)
G06F 21/78        (2013.01)

(52) U.S. Cl.
CPC .......... *G06F 21/564* (2013.01); *G06F 21/552* (2013.01); *G06F 21/78* (2013.01)

(58) Field of Classification Search
CPC ...... G06F 21/564; G06F 21/552; G06F 21/78; G06F 21/56; G06F 21/554;
(Continued)

(56) References Cited

U.S. PATENT DOCUMENTS 9,560,068  B2     1/2017   Figlin et al.
11,030,314  B2     6/2021   Kucherov et al.
(Continued)

OTHER PUBLICATIONS

E. Berruetta, et al., "Crypto-ransomware detection using machine learning models in file-sharing network scenarios with encrypted traffic," Elsevier, Dec. 15, 2022, 17 pp.
(Continued)

*Primary Examiner* — Wasika Nipa
*Assistant Examiner* — Edgar W Xie
(74) *Attorney, Agent, or Firm* — Konrad, Raynes, Davda & Victor LLP; David Victor

(57) ABSTRACT

Provided are a computer program product, system, and method for aggregating input/output operation features extracted from storage devices to form a machine learning vector to check for malware. Feature extraction functions are generated for the storage devices, indicating I/O operation features for the storage devices to gather. The feature extraction functions are communicated to the storage devices. The feature extraction functions transmitted to the storage devices cause the storage devices to gather information on I/O operation features, identified in the feature extraction functions, from the storage devices and transmit the information on the I/O operation features to the storage controller. The information on the I/O operation features are received from the storage devices. Information based on the received information on the I/O operation features are inputted into a machine learning model to output indication whether data in the storage devices contains malware.

20 Claims, 6 Drawing Sheets

(58) Field of Classification Search
CPC .......... G06F 2221/034; H04L 63/1416; H04L 63/1408; H04L 63/1433; H04L 63/20; H04L 67/1097
See application file for complete search history.

(56) References Cited

U.S. PATENT DOCUMENTS

| | | | |
|---|---|---|---|
| 11,243,712 B2 * | 2/2022 | Kulli ..................... G06F 3/0683 |
| 2020/0125573 A1 | 4/2020 | Zhang et al. |
| 2020/0133545 A1 * | 4/2020 | Alkalay .............. G06F 12/0238 |
| 2022/0070190 A1 | 3/2022 | Giterman et al. |
| 2022/0188028 A1 | 6/2022 | Mesnier et al. |
| 2024/0176882 A1 * | 5/2024 | Dar ....................... G06F 21/554 |

OTHER PUBLICATIONS

A. Heydarigorji, et al., "In-storage Processing of I/O Intensive Applications on Computational Storage Drives," arXiv2112.12415v1, International Journal of Advanced Networking & Applications (IJANA), Dec. 23, 2021, 7 pp.
M. Hirano, et al., "Machine Learning Based Ransomware Detection Using Storage Access Patterns Obtained From Live-forensic Hypervisor," arXiv2205.137652v2, Aug. 18, 2022, 8 pp.
M. Hirano, et al., "RanSAP: An open dataset of ransomware storage access patterns for training machine learning models," Forensic Science International: Digital Investigation, vol. 40, 2022, 22 pp.
D. Gagulic, et al., "Ransomware Detection with Machine Learning in Storage Systems," University of Zurich Department of Informatics, Feb. 13, 2023, 114 pp.
C. Constantinescu, et al., "Sentinel: Ransomware Detection in File Storage," SYSTOR '21: Proceedings of the 14th ACM International Conference on Systems and Storage, Association for Computing Machinery, Jun. 2021, 1 pp.
"What you Need to Know about Signature-based Malware Detection," RiskXchange, 4 pp.[online][retrieved on Aug. 4, 2023] https://riskxchange.co/1006984/what-is-signature-based-malware-detection/.
D.P. Anderson, et al., "SETI@home an Experiment in Public-Resource Computing", ACM, vol. 45, No. 11, Nov. 2002, 6 pp.
"Data Security that Works", Cigent Technology, Inc., 2023, 4 pp. [online][retrieved on Aug. 21, 2023] https://www.cigent.com/products.
E. Kim, et al., "SSD Performance—A Primer, An Introduction to Solid State Drive Performance, Evaluation and Test" SNIA, Aug. 2013, 28 pp.
"Data Security that Works", Cigent Technology, Inc., 2023, 4 pp. [online][retrieved on Aug. 21, 2023] https://www.cigent.com/products#securessd+.

* cited by examiner

Feature Extraction Function

Machine Learning Vector

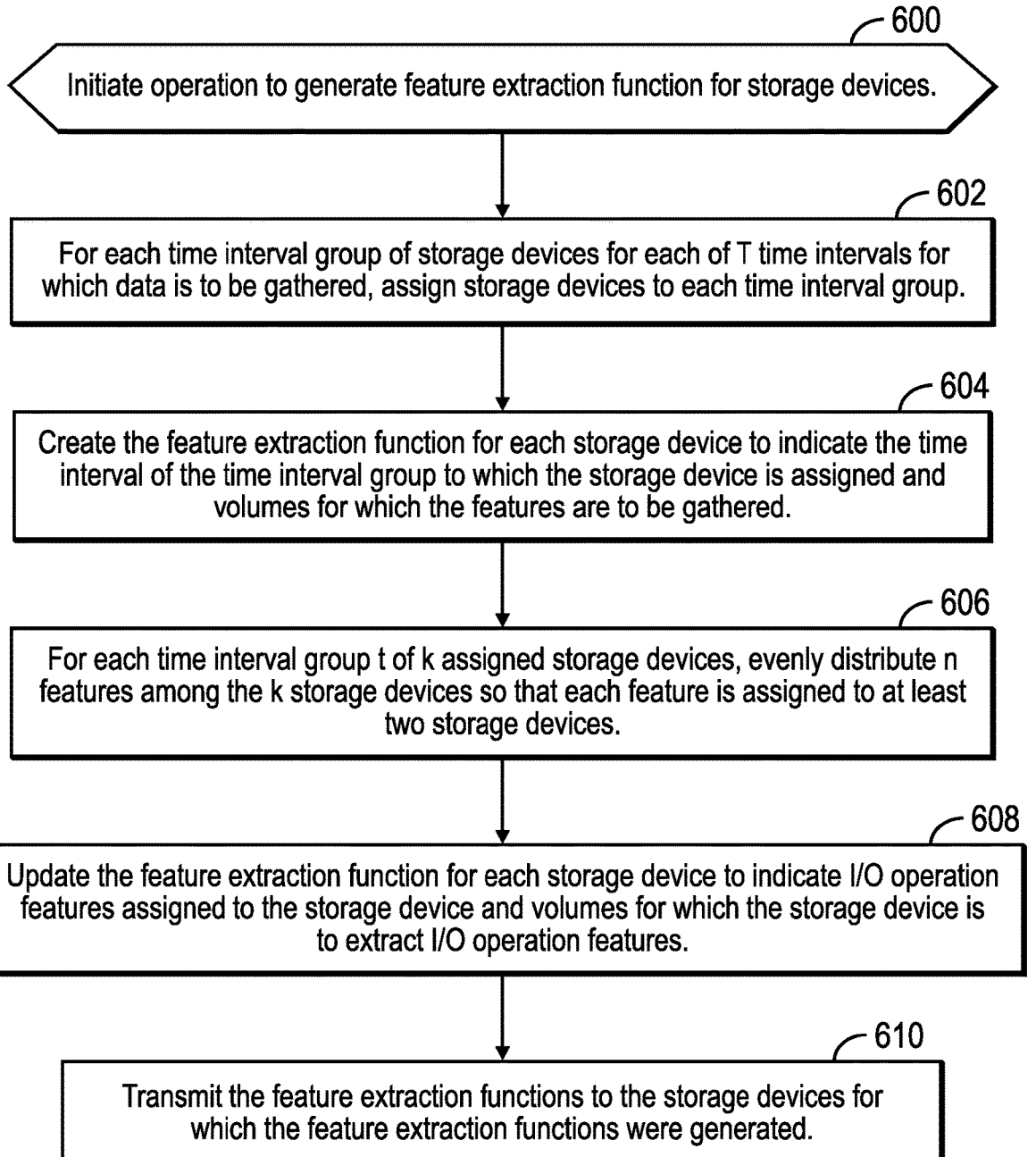

600

Initiate operation to generate feature extraction function for storage devices.

602

For each time interval group of storage devices for each of T time intervals for which data is to be gathered, assign storage devices to each time interval group.

604

Create the feature extraction function for each storage device to indicate the time interval of the time interval group to which the storage device is assigned and volumes for which the features are to be gathered.

606

For each time interval group t of k assigned storage devices, evenly distribute n features among the k storage devices so that each feature is assigned to at least two storage devices.

608

Update the feature extraction function for each storage device to indicate I/O operation features assigned to the storage device and volumes for which the storage device is to extract I/O operation features.

610

Transmit the feature extraction functions to the storage devices for which the feature extraction functions were generated.

FIG. 6

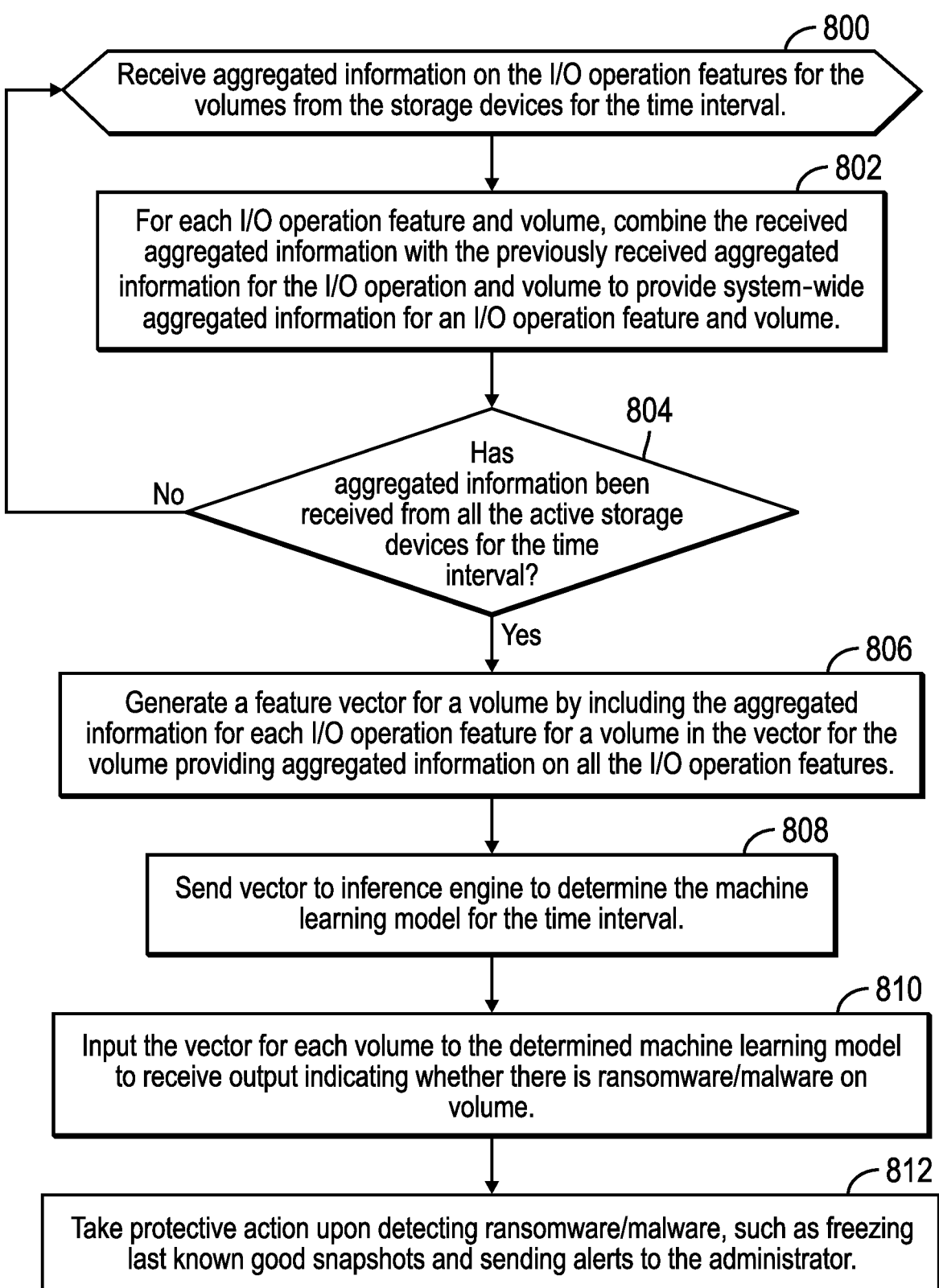

800

Receive aggregated information on the I/O operation features for the volumes from the storage devices for the time interval.

802

For each I/O operation feature and volume, combine the received aggregated information with the previously received aggregated information for the I/O operation and volume to provide system-wide aggregated information for an I/O operation feature and volume.

804

Has aggregated information been received from all the active storage devices for the time interval?

No

Yes

806

Generate a feature vector for a volume by including the aggregated information for each I/O operation feature for a volume in the vector for the volume providing aggregated information on all the I/O operation features.

808

Send vector to inference engine to determine the machine learning model for the time interval.

810

Input the vector for each volume to the determined machine learning model to receive output indicating whether there is ransomware/malware on volume.

812

Take protective action upon detecting ransomware/malware, such as freezing last known good snapshots and sending alerts to the administrator.

AGGREGATING INPUT/OUTPUT OPERATION FEATURES EXTRACTED FROM STORAGE DEVICES TO FORM A MACHINE LEARNING VECTOR TO CHECK FOR MALWARE

BACKGROUND OF THE INVENTION

1. Field of the Invention

The present invention relates to a computer program product, system, and method for aggregating input/output operation features extracted from storage devices to form a machine learning vector to check for malware.

2. Description of the Related Art

Ransomware is a type of malware that infiltrates a computer system and encrypts user data to then demand payment of money or a ransom to have the data unencrypted. A network intrusion detection system scans traffic on a network to detect malicious traffic containing ransomware. Signature based detection uses a digital footprint to scan network traffic to compare with signatures of known malware to detect malware. Anomaly based intrusion detection uses a rules or heuristic based system to detect for behavior that indicates presence of a malicious program.

Machine learning based ransomware detection may use low-level memory access patterns from a physical address space obtained from a hypervisor layer to detect ransomware.

SUMMARY

Provided are a computer program product, system, and method for aggregating input/output operation features extracted from storage devices to form a machine learning vector to check for malware. Feature extraction functions are generated for the storage devices, indicating I/O operation features for the storage devices to gather. The feature extraction functions are communicated to the storage devices. The feature extraction functions transmitted to the storage devices cause the storage devices to gather information on I/O operation features, identified in the feature extraction functions, from the storage devices and transmit the information on the I/O operation features to the storage controller. The information on the I/O operation features are received from the storage devices. Information based on the received information on the I/O operation features are inputted into a machine learning model to output indication whether data in the storage devices contains malware.

BRIEF DESCRIPTION OF THE DRAWINGS

FIG. 6 illustrates an embodiment of operations to generate feature extraction functions indicating I/O operation features for storage devices to use to extract the I/O operation features.

FIG. 8 illustrates an embodiment of operations for a storage controller to form machine learning vectors from I/O operation features gathered and aggregated by the storage devices.

DETAILED DESCRIPTION

Figure 1:
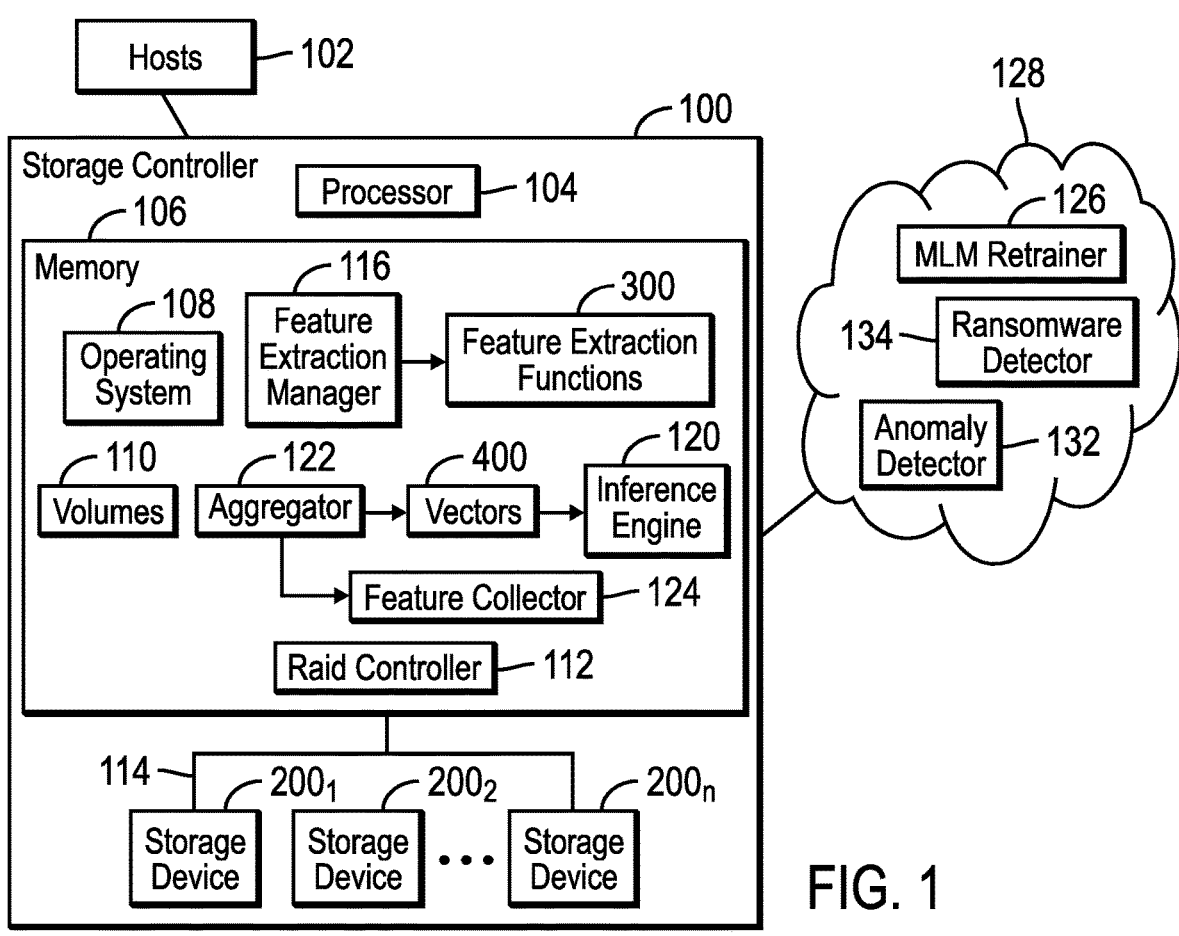
FIG. 1 illustrates an embodiment of a computing environment to detect malware, including ransomware.

The description herein provides examples of embodiments of the invention, and variations and substitutions may be made in other embodiments. Several examples will now be provided to further clarify various embodiments of the present disclosure:

Example 1: A computer-implemented method for a storage controller to gather I/O operation features from a plurality of storage devices. The method comprises generating feature extraction functions, for the storage devices, indicating I/O operation features for the storage devices to gather. The method further comprises communicating the feature extraction functions to the storage devices. The method further comprises that the feature extraction functions transmitted to the storage devices cause the storage devices to perform gathering information on I/O operation features, identified in the feature extraction functions, from the storage devices and transmitting the information on the I/O operation features to the storage controller. The method further comprises receiving the information on the I/O operation features from the storage devices. The method further comprises inputting information based on the received information on the I/O operation features into a machine learning model to output indication whether data in the storage devices contains malware. Thus, embodiments advantageously reduce processing burdens on the storage controller by having the storage devices gather the I/O operation features. Further, bus bandwidth is minimized because the storage devices transfer aggregated I/O operation features across the bus instead of all the raw I/O operation features.

Example 2: The limitations of any of Examples 1 and 3-11, where the method further comprises at least two of the feature extraction functions include different subsets of at least one I/O operation feature to control at least two of the storage devices to gather and aggregate information on different I/O operation features, and transmit back to the storage controller. Thus, embodiments advantageously distribute different subsets of I/O operations to different of the storage devices to reduce processing burdens on the storage devices because the storage devices only gather and aggregate a limited set of assigned I/O operation features. Still further, reducing processing burdens allows the storage devices to extract more sophisticated features, such as entropy and heat regions, and more sophisticated statistical aggregations of the data.

Example 3: The limitations of any of Examples 1, 2 and 4-11, where the method further comprises that at least two of the feature extraction functions indicate a same I/O operation feature for at least two of the storage devices to gather information on the same I/O operation feature, and transmit back to the storage controller. Thus, embodiments advantageously distribute features to the storage devices such that each feature is extracted by at least two storage devices to provide redundancy so that even if a storage device fails, there is another surviving storage device to continue to extract features assigned to that storage device. This ensures that in the event of a storage device failure, feature extraction may continue with respect to all features needed to form the machine learning vector.

Example 4: The limitations of any of Examples 1-3 and 5-11, where the method further comprises that the feature extraction functions communicated to the storage devices evenly distribute the I/O operation features to the storage devices and assign the I/O operation features to at least two of the storage devices. Thus, embodiments advantageously distribute features among storage devices so that feature extraction processing is load balanced among the storage devices to improve storage device performance. Load balancing helps reduce processing burdens when the storage devices have to gather and aggregate I/O operation features for numerous volumes, and when the storage devices themselves have limited processing capabilities Example 5: The limitations of any of Examples 1-4 and 6-11, where the method further comprises that the I/O operation features comprise at least a plurality of features of a set of features consisting of: entropy of data in a storage device, a compression ratio of the data in a storage device; logical block addresses (LBAs) to which I/O operations are directed; an I/O type; I/O size; I/O request rate; number of rewrites; and read and write heat of regions of the storage devices. Thus, embodiments advantageously include several I/O operation features on storage device I/O operations to provide a breadth of information to aggregate in the feature vector to provide more robust input to improve the predictions by the machine learning models.

Example 6: The limitations of any of Examples 1-5 and 7-11, where the method further comprises that the feature extraction functions cause the storage devices to gather information on I/O operation features for different volumes for which data is stored at the storage devices. Thus, embodiments advantageously distribute the volumes for which storage devices are to extract I/O operation features to reduce processing burdens on the storage devices by having the storage devices extract I/O operation features for different sets of volumes.

Example 7: The limitations of any of Examples 1-6 and 8-11, where the method further comprises that there are at least two groups of storage devices, where each of the groups of storage devices are associated with different time intervals. The method further comprises that feature extraction functions sent to the storage devices in each group of the groups causes the storage devices in the group to gather information on the I/O operation features for a time interval associated with group. The method further comprises that there are machine learning models associated with different time intervals. The method further comprises that the information on the I/O operation features received for a group of storage devices are inputted into a machine learning model associated with the time interval associated with the group of storage devices from which the information was received. Thus, embodiments advantageously extract and aggregate I/O operations in different time intervals to improve the accuracy of the results from the machine learning models because sampling at different time intervals may result in different classifications of malware/ransomware.

Example 8: The limitations of any of Examples 1-7 and 9-11, where the method further comprises forming a vector for each volume comprising the information for the I/O operation features received from the storage devices, where the vector for each volume is inputted into the machine learning model to determine whether specific of the volumes contain malware. Thus, embodiments advantageously use the information for the I/O operation features received from the storage devices to form a vector for each volume to allow for isolation of determinations of malware/ransomware to specific volumes because certain volumes may not have malware/ransomware and thus do not need to be quarantined and may continue to be made available.

Example 9: The limitations of any of Examples 1-8, 10, and 11, where the method further comprises aggregating, by the storage controller, the received information on the I/O operation features from the storage devices into system-wide aggregated information on the I/O operation features, where the system-wide aggregated information on the I/O operation features is inputted to the machine learning model. Thus, embodiments advantageously reduce processing burdens on the storage controller by having the storage devices gather the I/O operation features.

Example 10: The limitations of any of Examples 1-9 and 11, where the method further comprises that the storage devices are caused to further aggregate the gathered information on the I/O operation features into aggregated information on the I/O operation features, and that the received information from the storage devices comprises the aggregated information. The method further comprises that the inputted information is based on the aggregated information. Thus, embodiments advantageously further reduce processing burdens on the storage controller by having the storage devices aggregate the gathered information on the I/O operations into the aggregated information.

Example 11: The limitations of any of Examples 1-10, where the method further comprises that that the aggregating, at a storage device, the gathered information on an I/O operation feature comprises calculating a mean and variance of the gathered information for the I/O operation feature. Thus, embodiments advantageously further reduce processing burdens on the storage controller by having the storage devices calculate the mean and variance of the gathered information.

Additionally or alternatively, an embodiment in which the element of Example 1 where the inputted information based on the received information on the I/O operation feature is further sent to a machine learning model (MLM) retrainer outside the storage controller, for example, in a cloud computing environment or inference engine, to use to retrain an anomaly detector machine learning model and ransomware detector machine learning model to improve the detection accuracy based on whether malware/ransomware is detected. This arrangement improves predictions by the machine learning models by training the machine learning model with the information used to generate the outcome classification of malware or not.

Described embodiments provide improved computer technology to detect ransomware by having the storage devices in a storage controller environment extract I/O operation features collected at the storage devices from I/O operations, including features such as entropy, compression, Logical Block Address (LBA) information, I/O type (e.g., read/write/trim), time since last update, and volume identifier. The storage devices may aggregate the collected I/O operation features and then forward the aggregated collected I/O operation features to the storage controller. The storage controller may then further aggregate the aggregated I/O operation features from the storage devices and then form machine learning vectors from the aggregated I/O operation features to an inference engine for machine learning classification as malware/ransomware.

Described embodiments reduce processing burdens on the storage controller by having the storage devices gather and aggregate I/O operation features. Further, bus bandwidth is minimized because the storage devices transfer aggregated I/O operation features across the bus instead of all the raw I/O operation features. Yet further, processing burdens on the storage devices may be limited by assigning I/O operation features to storage devices so the storage devices only gather and aggregate a limited set of assigned I/O operation features.

In addition, the described embodiments can be used to gather and aggregate I/O operation features in different time intervals or using predefined I/O sampling rates on the storage devices to overall improve the accuracy of the results from the machine learning models.

Described embodiments provide further improvements to computer technology because the extraction of I/O operation features is at the block-level context where no identifiers on unique host actions are available.

Yet further, the machine learning vectors may be used to retrain the malware and ransomware machine learning model detectors.

FIG. 1 illustrates an embodiment of a storage controller 100 coupled to a plurality of storage devices $200_1$, $200_2$ . . . $200_n$ to store data from hosts 102. The storage controller 100 includes a processor 104 and a memory 106 having an operating system 108 to manage Input/Output (I/O) operations, e.g., read/write request, from the hosts 102 and organize data in logical volumes 110. The storage controller 100 includes a Redundant Array of Independent Disks (RAID) controller 112 to stripe data among the storage devices $200_1$ . . . $200_n$. The RAID 112 controller may comprise a program in the memory 104 or a separate hardware device. The storage controller 100 includes a bus 114 or interface, to connect to the storage devices $200_1$ . . . $200_n$, such as a Peripheral Component Interconnect Express (PCIe) bus using the Non-Volatile Memory Express (NVMe) protocol.

The memory 106 further includes a feature extraction manager 116 to determine features of I/O operation measurements or performance data to extract from the storage devices $200_1$. $200_n$ to include in machine learning vectors 400 that are provided to an inference engine 120 to determine whether the extracted I/O operation features in the vectors indicate that the storage devices contain malware or ransomware. The I/O operation features extracted from the storage devices $200_1$ . . . $200_n$ may comprise features related to read and write requests gathered and stored at the storage devices $200_1$ . . . $200_n$ including, but not limited to: entropy of data in a storage device $200_i$, i.e., randomness of data; a compression ratio of the data in the storage device; logical block addresses (LBAs) to which I/O operations are directed; an I/O type; I/O size; I/O request rate; number of rewrites; read and write heat of regions of the storage devices indicating frequency of read and write access to a region of the storage, etc. Feature extraction of the I/O operation features may concern gathering statistics on all I/O operation features (unsampled) or sampled I/O operation features, such as a mean and variance of the data of the measurements. The I/O operation feature of LBAs may comprise a variance of access locations of LBAs, which may indicate an extent to which I/O access is sequential versus random. All these features may be predictive of whether the data in a storage device includes ransomware or malware.

The feature extraction manager 116 may generate feature extraction functions 300 to send to the storage devices $200_1$ . . . $200_n$, which define the one or more I/O operation features the storage device $200_i$ will extract for volumes 110 stored in the storage device $200_i$. The feature extraction manager 116 may generate feature extraction functions 300 that distribute features to the storage devices $200_1$ . . . $200_n$ so that each of the storage devices $200_i$ only gathers a subset set of all the features. Further, the feature extraction manager 116 may generate feature extraction functions 300 to distribute features to the storage devices such that each feature is extracted by at least two storage devices to provide redundancy so that even if a storage device fails $200_i$, there is another surviving storage device $200_j$ to continue to extract features assigned to that storage device. This ensures that in the event of a storage device failure, feature extraction may continue with respect to all features needed to form the machine learning vector 400.

The feature extraction manager 116 may change the features being extracted based on runtime criteria (workload properties, availability, redundancy) that define the importance of the features.

The memory 106 includes an aggregator 122 that receives the I/O operation features extracted by the storage devices $200_1$ . . . $200_n$ and forms vectors 400 of all the features for different volumes, so that the machine learning determination of ransomware and malware may be determined by volume. The aggregator 122 may further pass the aggregated I/O operation features for volumes to a feature collector 124. The feature collector 124 provides the gathered features to send to a machine learning model (MLM) retrainer 126 outside the storage controller 100, for example, in a cloud computing environment 128, to use to retrain an anomaly detector 132 machine learning model and ransomware detector 134 machine learning model to improve the detection accuracy based on whether malware/ransomware is detected.

The inference engine 120 on receiving the machine learning vectors 400 may send the vectors 400 to a cloud computing environment to be input to the ransomware detector 134 and anomaly detector 132 to detect ransomware and malware, respectively. In further embodiments, the anomaly detector 132 and ransomware detector 134 may be contained in the inference engine 120 to perform the processing at the storage controller 100.

In the context of computational storage, the feature extraction manager 116, the aggregator 122, the inference engine 120, and the feature collector 124 may be executed as a computational storage function (CSF) where the storage controller 100 implements a computational storage array (CSA) and where the feature extraction functions 300 correspond to computational storage functions being deployed on computational storage devices such as storage devices 200.

Figure 2:
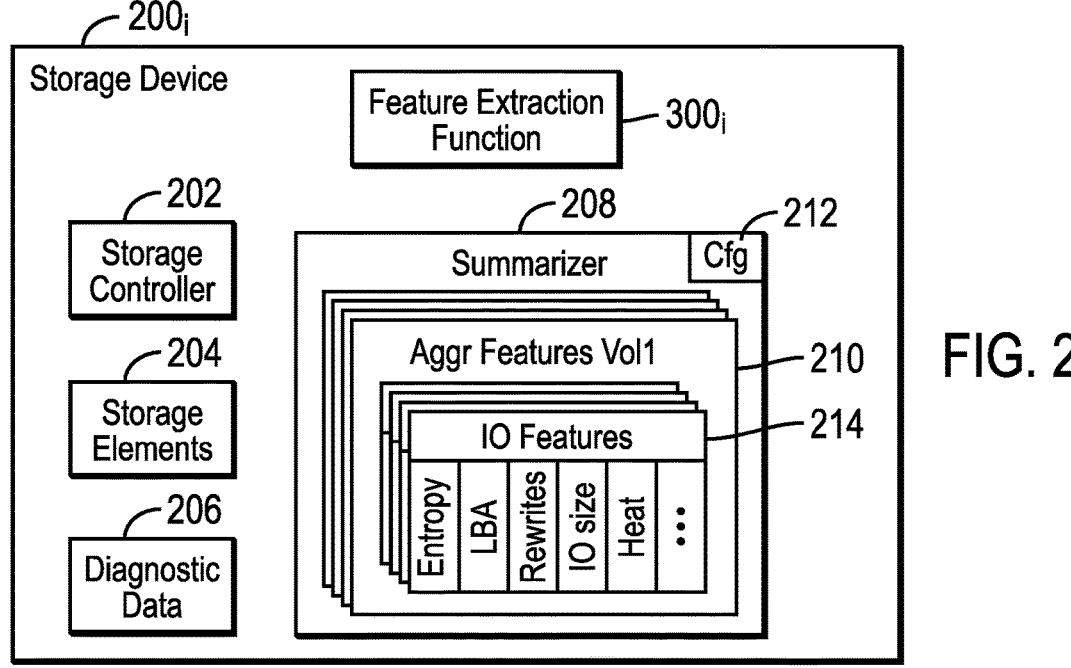
FIG. 2 illustrates an embodiment of a storage device.

FIG. 2 illustrates an embodiment of a storage device $200_i$, comprising one of the storage devices $200_1$ . . . $200_n$, and includes a storage controller 202 to manage I/O operations to storage elements 204, comprising the storage media, such as a solid state drive (SSD) of NAND cells, a hard disk drive, and other non-volatile media. The storage device 200 maintains diagnostic data 206 having the I/O operation features gathered at the storage device with respect to I/O operations to the storage elements 204. The diagnostic information 206 may include Self-Monitoring, Analysis and Reporting Technology (SMART) data and Storage Networking Industry Association (SNIA) performance test specification performance data. The storage device $200_i$ further includes a summarizer 208 that gathers and aggregates I/O operation features extracted by the storage controller 202 in hardware for each I/O operation or from the diagnostic data 206 for features defined in the received feature extraction function $300_i$. The configuration data (cfg) 212 maintained in the summarizer 208 comprises the I/O operation features assigned to the storage device 200$_i$ in the feature extraction function 300$_i$. The summarizer 208 may aggregate one or more of the I/O operation features 210, for each of the volumes 110 managed by the operating system 108, into aggregated feature information 210 for each volume. The summarizer 208 may be implemented as a computational storage function (CSF) in a computational storage drive (CSD). Each of the aggregated features 210 may include one or more of the I/O features 214 available at the storage device 200$_i$.

In further embodiments, the information collected by the summarizer 208 does not comprise diagnostic information 206, but may be information extracted in the storage device 200$_i$ hardware on each I/O operation and then made available to the summarizer 208, which may comprise software running on a dedicated core in the storage controller 100.

In described embodiments, host 102 I/O operations may be performed on a block storage volume and block storage volumes 110 are built on top of a RAID array spanning the storage devices 200$_1$ . . . 200$_n$, and each storage device 200$_i$ processes just a subset of I/O operation.

The arrows shown in FIG. 1 between the components and objects in the storage controller represent a data flow between the components.

Generally, program modules, such as the program components 108, 112, 116, 120, 122, 124, 126, 134, 132, 212, among others, may comprise routines, programs, objects, components, logic, data structures, and so on that perform particular tasks or implement particular abstract data types. The program components and hardware devices of the systems 100, 200$_i$ may be implemented in one or more storage systems or computer systems, where if they are implemented in multiple storage systems or computer systems, then the storage systems or computer systems may communicate over a network or a bus.

The program components 108, 112, 116, 120, 122, 124, 126, 134, 132, 212, among others, may be accessed by a processor from memory to execute. Alternatively, some or all of the program components 108, 112, 116, 120, 122, 124, 126, 134, 132, 212, among others, may be implemented in separate hardware devices, such as Application Specific Integrated Circuit (ASIC) hardware devices or a Field Programmable Gate Array (FPGA). Program components implementing machine learning models, such as program components 120, 134, 132, among others, may be implemented in an Artificial Intelligence (AI) hardware accelerator.

In certain embodiments, program components 120, 132, 134, among others, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation used by the MLM retrainer 126 to train a neural network machine learning module, such as anomaly detector 132 and ransomware detector 134, biases at nodes in the hidden layer are adjusted accordingly to produce the output, such as classification an MLM vector 400 comprises malware (anomaly) and ransomware, with specified confidence levels based on the input parameters. The program components 120, 132, 134, among others, may be trained to produce their output from feedback and their output based on the input. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

In backward propagation performed by the MLM retrainer 126, used to train a neural network machine learning module, such as the program components 120, 132, 134, margin of errors are determined based on a difference of the calculated predictions and user rankings of the output. Biases (parameters) at nodes in the hidden layer are adjusted accordingly to minimize the margin of error of the error function.

In an alternative embodiment, the components 120, 132, 134 may be implemented not as a machine learning module, but implemented using a rules based system to determine the outputs from the inputs. The components 120, 132, 134 may further be implemented using an unsupervised machine learning module, or machine learning implemented in methods other than neural networks, such as multivariable linear regression models.

The functions described as performed by the program components 108, 112, 116, 120, 122, 124, 126, 134, 132, 212, among others, may be implemented as program code in fewer program modules than shown or implemented as program code throughout a greater number of program modules than shown.

The hosts 102 may comprise host servers. The storage controller 100 may comprise a storage server, enterprise storage server, etc.

Figures 3, 4, 5:
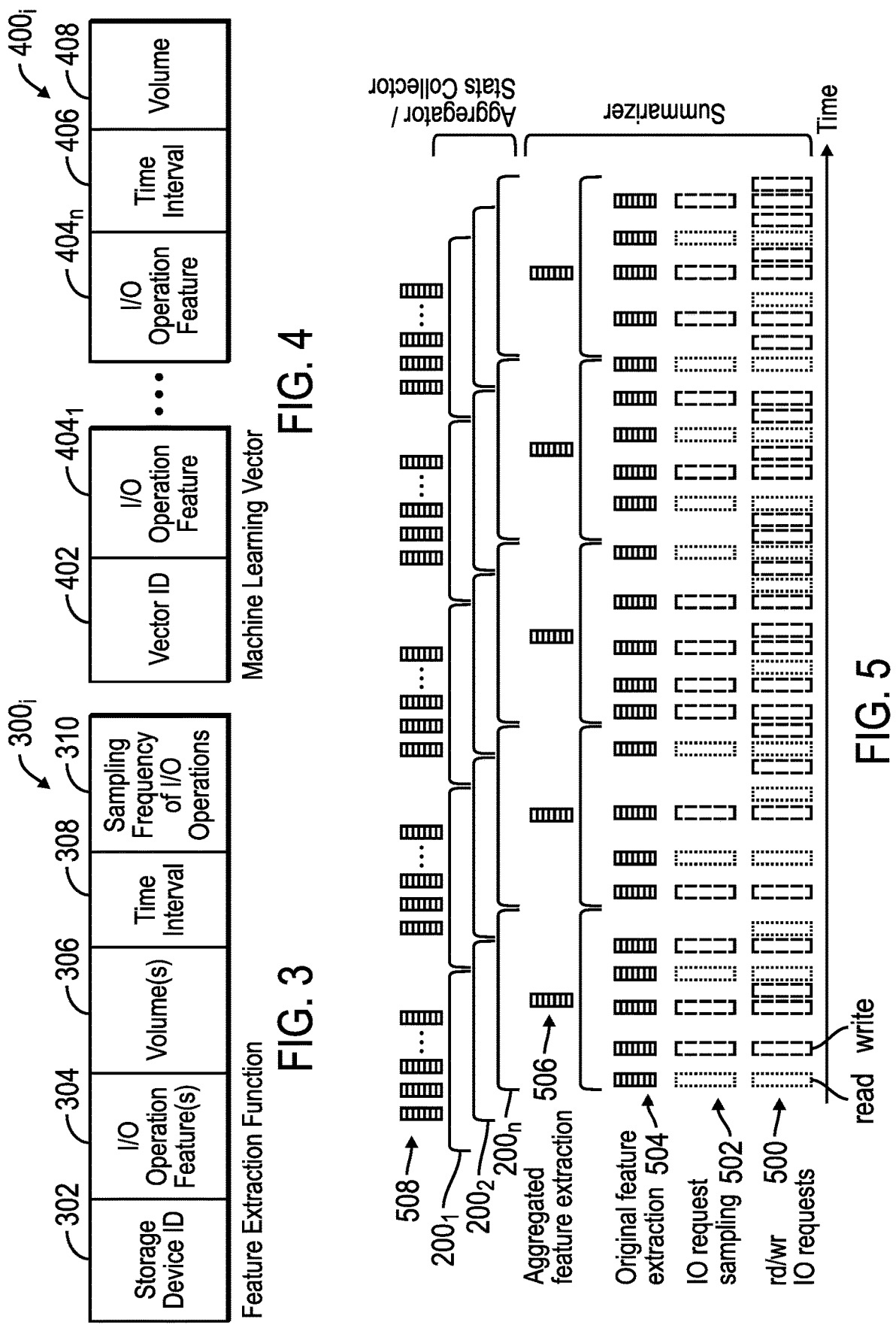
FIG. 3 illustrates an embodiment of a feature extraction function.
FIG. 4 illustrates an embodiment of a machine learning vector.
FIG. 5 illustrates an example of how I/O operation features are extracted from a storage device and aggregated.

FIG. 3 illustrates an embodiment of a feature extraction function 300$_i$ generated for and sent to a storage device 200$_i$ and includes: a storage device identifier (ID) 302 of the storage device 200$_i$ for which the feature extraction function 300$_i$ was created; one or more I/O operation features 304 to be extracted at the storage device 302; volumes 306 for which I/O operation features 304 are to be extracted, or all volumes 110; a time interval 308 during which the I/O operation features are gathered; and a sampling frequency of I/O operations 310.

FIG. 4 illustrates an embodiment of a machine learning vector 400$_i$, formed by the aggregator 122, as including a vector ID 402; the aggregate information for all the n I/O operation features 404$_1$ . . . 404$_n$; a time interval 406 during which the feature information was gathered, which may be used to determine a machine learning model to process the vector 400$_i$; and a volume 408 for which the I/O operation features 404$_1$ . . . 404$_n$ are generated.

FIG. 5 provides an illustration of how the summarizer 208 may gather and aggregate I/O operation features at a storage device 200$_i$. Read/write requests 500 comprise all the read, write or trim requests received at a storage device 200$_n$ over time. The summarizer 208 may sample certain of the read/write requests 502 as an I/O request sampling 502. In certain embodiments, when the storage devices are limited to extracting a subset of I/O operation features, all the I/O operations may be processed for aggregation without sampling. The summarizer 208 may then extract features 504 from the sampling 502 of I/O requests and then aggregate the extracted features 504 into aggregate feature information 506, such as a mean, variance, kurtosis, slope, and histogram of the extracted features 504.

Original features comprise features directly extracted from the I/O operations. Aggregated features comprise features that are extracted from the original features over a given time interval for a particular volume. In embodiments where the I/O operation features provided in the feature extraction functions 300 describe aggregated features, the I/O operation features may also implicitly define the original features, in addition to the aggregated features, that must be extracted in the summarizer 208 to calculate the requested I/O operation features. Similar information would be aggregated at other of the storage devices 200₁. The storage controller 100 aggregator 122 may aggregate all the features 506 from all of the storage devices 200₁ . . . 200ₙ into system-wide aggregated feature information 508 for each feature. In aggregating all the features 506 into system-wide aggregated feature information 508, the aggregator 122 may both aggregate and filter the aggregated feature information 506 from the storage devices 200₁ . . . 200ₙ.

FIG. 6 illustrates an embodiment of operations performed by the feature extraction manager 116 to generate feature extraction functions 300 to propagate to the storage devices 200₁ . . . 200ₙ. Upon initiating an operation (at block 600) to generate the feature extraction functions 300, for each time interval group for which I/O operation features are gathered, storage devices are assigned to each time interval group. For instances, n/T storage devices may be assigned to each time interval group to gather I/O operation features for a time interval, where n comprises the number of storage devices and T comprises the number of time intervals. The feature extraction manager 116 creates (at block 604) the feature extraction function 300ᵢ for each storage device 200ᵢ to indicate the time interval of the time interval group to which the storage device is assigned.

For each time interval group t of k assigned storage devices, the n features may be evenly distributed (at block 606) among the K storage devices so that each feature is assigned to at least two storage devices. The feature extraction function 300ᵢ for each storage device 200ᵢ is updated (at block 608) to indicate the I/O operation features 304 assigned to the storage device and volumes 306 for which the storage device is to extract I/O operation features. The generated feature extraction functions 300 are transmitted (at block 610) to the storage devices 200₁ . . . 200ₙ for which the n feature extraction functions 300₁ . . . 300ₙ were generated.

With the embodiment of FIG. 6, storage devices are assigned to the interval groups to gather features for each of the time intervals and to allow vectors 400 to be formed for each of the time intervals and volumes. Further, by distributing features among storage devices, feature extraction processing is load balanced among the storage devices to improve storage device performance. Load balancing helps reduce processing burdens when the storage devices have to gather and aggregate I/O operation features for numerous volumes, and when the storage devices themselves have limited processing capabilities. By limiting storage devices to process only a subset of the I/O operation features, all I/O operations may be processed at the storage device to form the aggregated information, without sampling. Further, reducing processing burdens at the storage devices, this allows the storage devices to extract I/O operation features for a greater number of volumes. Still further, reducing processing burdens allows the storage devices to extract more sophisticated features, such as entropy and heat regions, and more sophisticated statistical aggregations of the data.

In embodiments where storage volumes 110 are created on a RAID array, the I/O operations for all volumes are spread to all the storage devices in the RAID array. In such case, statistics of the aggregated I/O operation features from each storage device are expected to be similar, so that extraction of features from a limited number of storage devices for the volumes may accurately represent the I/O operations features realized on all the storage devices.

Yet further, each feature may be assigned to at least two storage devices for a given time interval to provide redundancy so that if one storage device fails, the I/O operation features may still be gathered by the surviving features to allow vectors 400 to continue to be formed to check for malware and ransomware.

In the embodiment of FIG. 6, storage devices are assigned to time interval groups to gather I/O operation features at different time intervals. In alternative embodiments, there may only be one time interval at which to gather I/O operation features, so that all storage devices may be used to gather the I/O operation features for the sole time interval at which I/O operation features are gathered and aggregated in the summarizer 208.

Figure 7:
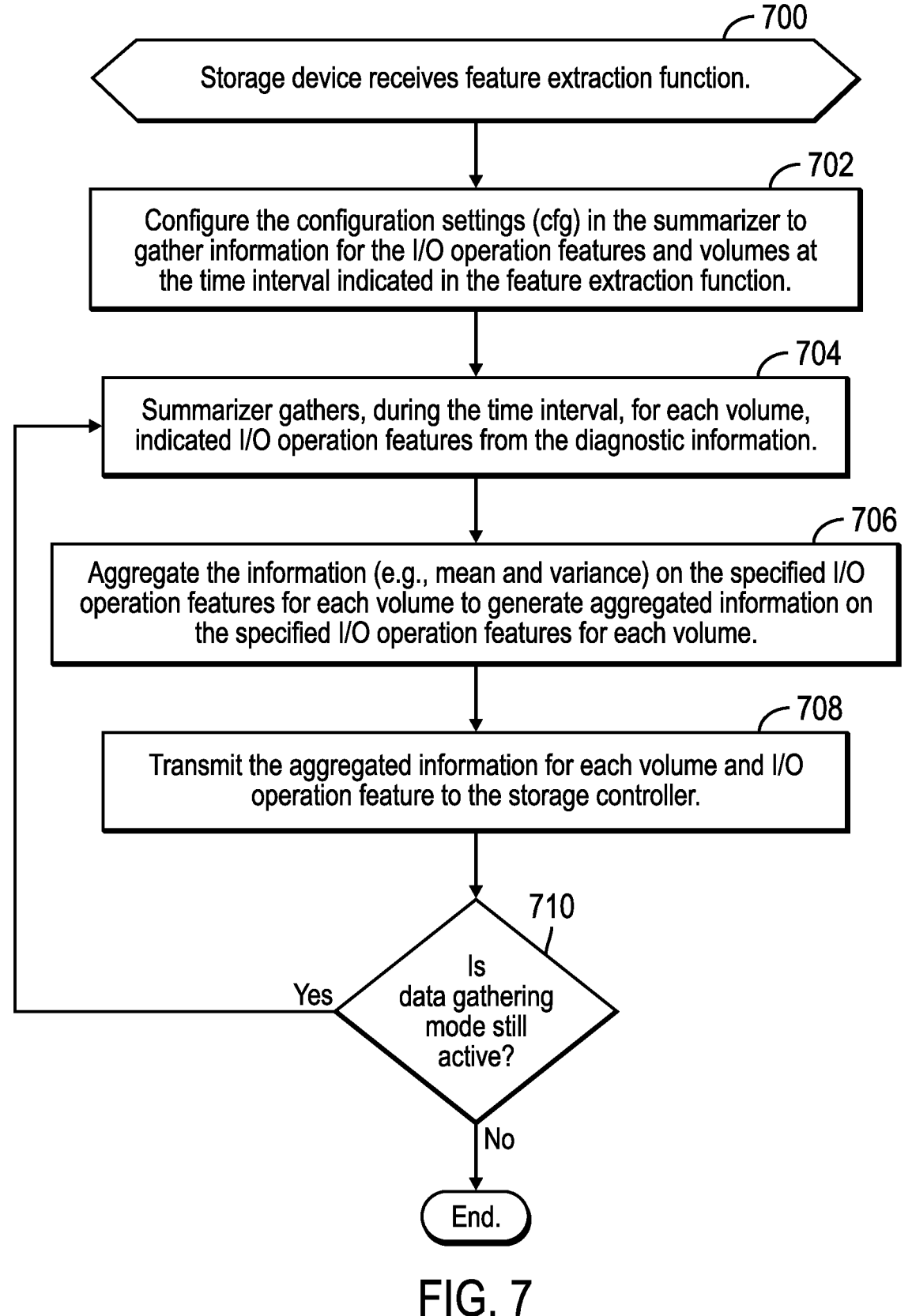
FIG. 7 illustrates an embodiment of operations for a storage device to process a feature extraction function to extract I/O operation features for the storage device.

FIG. 7 illustrates an embodiment of operations performed by the summarizer 208 at the storage devices 200₁ . . . 200ₙ to gather and aggregate I/O operation features at the storage device 200ᵢ. Upon receiving (at block 700) the feature extraction function 300ᵢ for the receiving storage device 200ᵢ, the configuration settings 212 in the summarizer 208 are updated (at block 702) to gather information for the I/O operation features 304 and volumes 306 at the time interval 308 indicated in the received feature extraction function 300ᵢ. The summarizer 208 gathers (at block 704), during the time interval 308, for each volume 306, indicated in the feature extraction function 300ᵢ, I/O operation features from the diagnostic information 206, such as by sampling information for the I/O operation feature 500 as described with respect to FIG. 5. Alternatively, I/O operation features may be extracted from all read/write requests without sampling.

The summarizer 208 aggregates (at block 706) the information (e.g., mean and variance) on the specified I/O operation features for each volume to generate aggregated information 210 on the specified I/O operation features for each volume, also shown as aggregated information 506 in FIG. 5. The aggregated information 210 for each I/O operation feature and volume may comprise a mean and variance based on the gathered I/O operation features for the volume and time interval 308. Additional aggregated information 210 may comprise: for entropy, a mean, histogram, variance, and kurtosis; entropy variation between read and write to same LBA; delta entropy variance between reads and writes; LBA variance, LBA kurtosis, LBA histogram; and time since last update histogram.

The gathered aggregated information 210 for each volume is transmitted (at block 708) to the storage controller 100 to use to form machine learning vectors 400 to input to the inference engine 120. If (at block 710) data gathering mode is still active, then control back to block 704 to gather, aggregate and transmit I/O operation features for the time interval 308. Otherwise, if (at block 710) the data gathering mode is not active, control ends.

With the embodiment of FIG. 7, the storage devices gather I/O operation features for a subset of features and perform the aggregation locally to reduce processing burdens on the storage controller 100. Further, because the I/O operation features are aggregated locally in the storage devices $200_i$ and aggregated information 210 is transmitted, network bandwidth on the bus 114 is minimized because only aggregated information 506 is transmitted, not all the raw I/O requests 500 or sampled I/O requests 502.

In an alternative embodiment, the storage devices may forward the raw gathered I/O operation features to the storage controller to perform the aggregation operation at block 706 and any further aggregation.

FIG. 8 illustrates an embodiment of operations performed by the aggregator 122 to form vectors 400 to input to the inference engine 120 for machine learning model processing by the anomaly detector 132 and/or ransomware detector 134. Upon receiving (at block 800) aggregated information 210 for volumes from the storage devices for a time interval, for each I/O operation feature and volume, the aggregator 122 combines (at block 802) the received aggregated information, received from the storage devices, and may additionally combine the received aggregated information with the previously received aggregated information for the I/O operation and volume to provide system-wide aggregated information for an I/O operation feature and volume. In further embodiments, received aggregated information may not be combined with previously received aggregated information. If (at block 804) aggregated information been received from all the active storage devices $200_i$ for the time interval, then the aggregator 122 generates (at block 806) a feature vector $400_i$ for a volume 408 by including the aggregated information for each I/O operation feature for a volume in the vector $400_i$ for the volume 408.

The vector 400$i$ is sent (at block 808) to the inference engine 120, which may determine a machine learning model, anomaly detector 132 and/or ransomware detector 134. for the time interval 406 for which the vector $400_i$ is generated. The vector $400_i$ for each volume is inputted (at block 810) to the determined machine learning model, anomaly detector 132 and/or ransomware detector 134, to receive output indicating for the volume whether there is ransomware/malware on the volume. Upon receiving (at block 812) a classification of malware/ransomware detected, the storage controller 100 may take protective action, such as freezing a last known good snapshot of the volumes 110 and throw an alert to an administrator of the detection.

With the embodiment of FIG. 8, a machine learning vector $400_i$ is formed from all the aggregated I/O operation features, which are determined by the storage devices $200_i$ gathering and aggregating I/O operations for a time interval.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
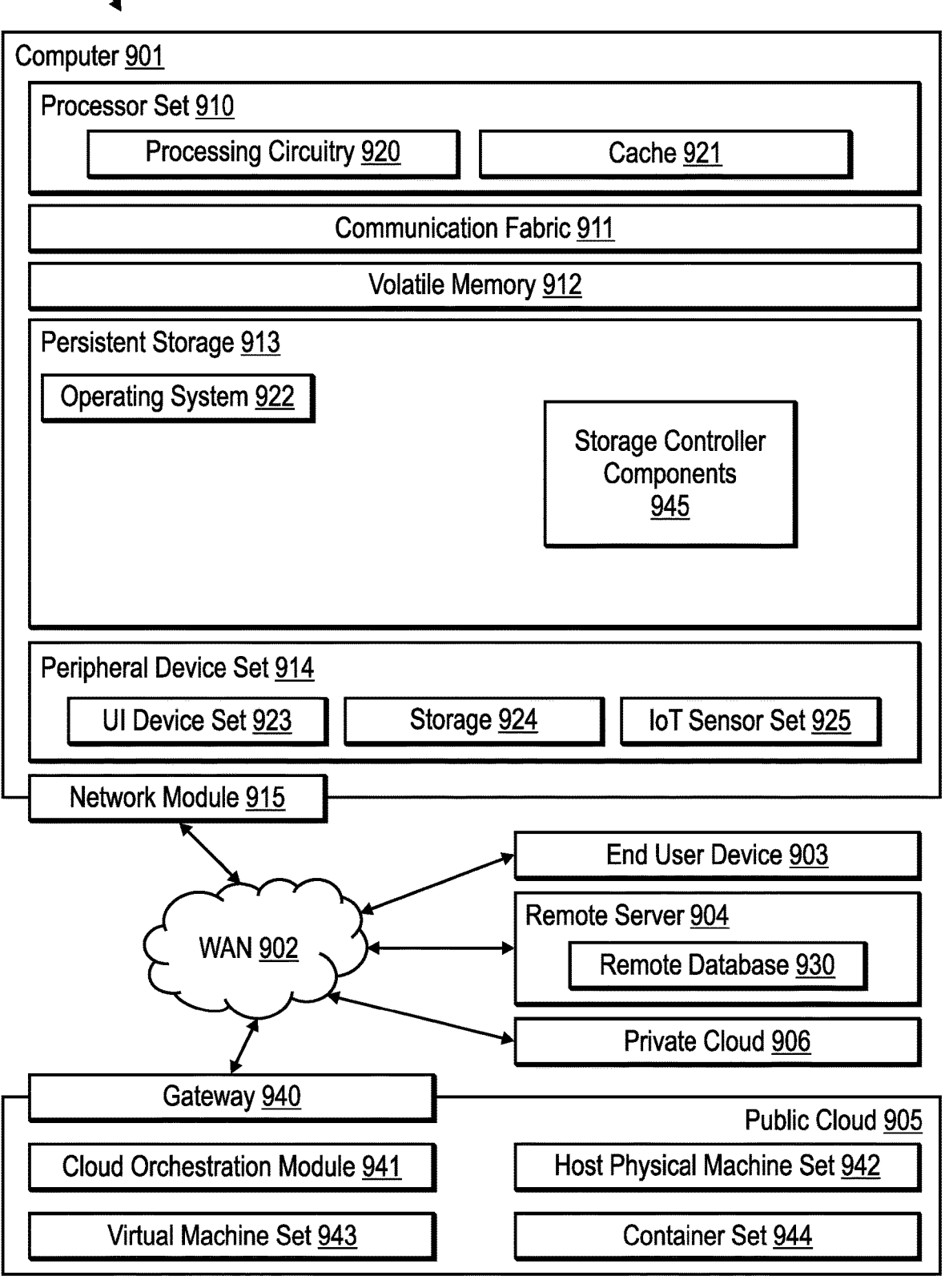
FIG. 9 illustrates a computing environment in which the components of FIGS. 1 and 2 may be implemented.

With respect to FIG. 9, computing environment 900 contains an example of an environment for the execution of at least some of the computer code involved in performing the inventive methods, such as the storage controller components 945, including the feature extraction manager 116 to generate feature extraction functions 300 and the aggregator 122 to generate vectors 400 to input to the inference engine 120 as described with respect to FIG. 1. In addition to the storage controller components 945, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and storage controller components 945, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 945 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 945 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. The storage 924 may comprise the storage devices $200_1 \ldots 200_n$. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902. In certain embodiments, the public cloud 905 may comprise the cloud 129 having the MLM retrainer 126, ransomware detector 134, and anomaly detector 132.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The letter designators, such as i, j, k, T, and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for gathering I/O operation features from a plurality of storage devices, wherein the computer program product comprises a computer readable storage medium, implemented in a storage controller, having computer readable program code embodied therein that when executed performs operations, the operations comprising:

generating feature extraction functions, for the storage devices, indicating I/O operation features for the storage devices to gather, wherein the I/O operation features comprise statistics and characteristics of read and write requests at the storage devices predictive of whether malware is contained in the storage devices;

communicating the feature extraction functions to the storage devices, wherein the feature extraction functions transmitted to the storage devices cause each storage device of the storage devices receiving a feature extraction function to perform:

gathering information on I/O operation features, identified in the feature extraction functions, from the storage device;

aggregating the gathered information by volume and I/O operation feature into aggregated information by volume and I/O operation feature for the I/O operation features gathered for volumes at the storage device; and transmitting the aggregated information by volume and I/O operation feature for the volumes and the I/O operation features to the storage controller;

for the volumes, aggregating the aggregated information for a given volume from the storage devices into system-wide aggregated information having the I/O operation features for the given volume; and inputting the system-wide aggregated information for the given volume into a machine learning model to output indication whether the given volume contains malware.

2. The computer program product of claim 1, wherein at least two of the feature extraction functions include different subsets of at least one I/O operation feature to control at least two of the storage devices to gather and aggregate information on different I/O operation features, and transmit to the storage controller.

3. The computer program product of claim 1, wherein at least two of the feature extraction functions indicate a same I/O operation feature for at least two of the storage devices to gather information on the same I/O operation feature, and transmit to the storage controller.

4. The computer program product of claim 1, wherein the feature extraction functions communicated to the storage devices evenly distribute the I/O operation features to the storage devices and assign the I/O operation features to at least two of the storage devices.

5. The computer program product of claim 1, wherein the I/O operation features comprise at least a plurality of features of a set of features consisting of: entropy of data in a storage device, a compression ratio of the data in a storage device; logical block addresses (LBAs) to which I/O operations are directed; an I/O type; I/O size; I/O request rate; number of rewrites; and read and write heat of regions of the storage device.

6. The computer program product of claim 1, wherein the feature extraction functions cause the storage devices to gather information on I/O operation features for different volumes for which data is stored at the storage devices.

7. The computer program product of claim 1, wherein there are at least two groups of storage devices, each group of the groups of storage devices are associated with different time intervals, wherein the feature extraction functions sent to the storage devices in each group of the groups causes the storage devices in each group to gather information on the I/O operation features for a time interval associated with each group, wherein there are machine learning models associated with different time intervals, wherein the information on the I/O operation features received for a group of storage devices are inputted into a machine learning model associated with the time interval associated with the group of storage devices from which the information was received.

8. The computer program product of claim 1, wherein the operations further comprise:

forming a vector for each volume comprising the system-wide aggregated information having the I/O operation features for each volume, wherein the vector for each volume is inputted into the machine learning model to determine whether the volumes contain malware.

9. The computer program product of claim 1, wherein the aggregating, at each storage device, the gathered information on an I/O operation feature comprises calculating a mean and variance of the gathered information for the I/O operation feature.

10. A system for gathering I/O operation features from a plurality of storage devices, comprising:

a processor; and a computer readable storage medium, implemented in a storage controller, having computer readable program code embodied therein that when executed performs operations, the operations comprising:

generating feature extraction functions, for the storage devices, indicating I/O operation features for the storage devices to gather, wherein the I/O operation features comprise statistics and characteristics of read and write requests at the storage devices predictive of whether malware is contained in the storage devices;

communicating the feature extraction functions to the storage devices, wherein the feature extraction functions transmitted to the storage devices cause each storage device of the storage devices receiving a feature extraction function to perform:

gathering information on I/O operation features, identified in the feature extraction functions, from the storage device;

aggregating the gathered information by volume and I/O operation feature into aggregated information by volume and I/O operation feature for the I/O operation features gathered for volumes at the storage device; and transmitting the aggregated information by volume and I/O operation feature for the volumes and the I/O operation features to the storage controller;

for the volumes, aggregating the aggregated information for a given volume from the storage devices into system-wide aggregated information having the I/O operation features for the given volume; and inputting the system-wide aggregated information for the given volume into a machine learning model to output indication whether the given volume contains malware.

11. The system of claim 10, wherein at least two of the feature extraction functions include different subsets of at least one I/O operation feature to control at least two of the storage devices to gather and aggregate information on different I/O operation features, and transmit to the storage controller.

12. The system of claim 10, wherein at least two of the feature extraction functions indicate a same I/O operation feature for at least two of the storage devices to gather information on the same I/O operation feature, and transmit to the storage controller.

13. The system of claim 10, wherein the feature extraction functions communicated to the storage devices evenly distribute the I/O operation features to the storage devices and assign the I/O operation features to at least two of the storage devices.

14. The system of claim 10, wherein there are at least two groups of storage devices, each group of the groups of storage devices are associated with different time intervals, wherein the feature extraction functions sent to the storage devices in each group of the groups causes the storage devices in each group to gather information on the I/O operation features for a time interval associated with each group, wherein there are machine learning models associated with different time intervals, wherein the information on the I/O operation features received for a group of storage devices are inputted into a machine learning model associated with the time interval associated with the group of storage devices from which the information was received.

15. A computer implemented method for gathering I/O operation features from a plurality of storage devices, comprising:

generating feature extraction functions, for the storage devices, indicating I/O operation features for the storage devices to gather, wherein the I/O operation features comprise statistics and characteristics of read and write requests at the storage devices predictive of whether malware is contained in the storage devices;

communicating the feature extraction functions to the storage devices, wherein the feature extraction functions transmitted to the storage devices cause each storage device of the storage devices receiving a feature extraction function to perform:

gathering information on I/O operation features, identified in the feature extraction functions, from the storage device;

aggregating the gathered information by volume and I/O operation feature into aggregated information by volume and I/O operation feature for the I/O operation features gathered for volumes at the storage device; and transmitting the aggregated information by volume and I/O operation feature for the volumes and the I/O operation features to a storage controller;

for the volumes, aggregating the aggregated information for a given volume from the storage devices into system-wide aggregated information having the I/O operation features for the given volume; and inputting the system-wide aggregated information for the given volume into a machine learning model to output indication whether the given volume contains malware.

16. The computer implemented method of claim 15, wherein at least two of the feature extraction functions include different subsets of at least one I/O operation feature to control at least two of the storage devices to gather and aggregate information on different I/O operation features, and transmit to the storage controller.

17. The computer implemented method of claim 15, wherein at least two of the feature extraction functions indicate a same I/O operation feature for at least two of the storage devices to gather information on the same I/O operation feature, and transmit to the storage controller.

18. The computer implemented method of claim 15, wherein the feature extraction functions communicated to the storage devices evenly distribute the I/O operation features to the storage devices and assign the I/O operation features to at least two of the storage devices.

19. The system of claim 10, wherein the operations further comprise:

forming a vector for each volume comprising the system-wide aggregated information having the I/O operation features for each volume, wherein the vector for each volume is inputted into the machine learning model to determine whether the volumes contain malware.

20. The computer implemented method of claim 15, further comprising:

forming a vector for each volume comprising the system-wide aggregated information having the I/O operation features for each volume, wherein the vector for each volume is inputted into the machine learning model to determine whether the volumes contain malware.

* * * * *